(12) United States Patent
Bernard

(10) Patent No.: US 8,019,325 B2
(45) Date of Patent: Sep. 13, 2011

(54) PODCASTING ON A MOBILE PHONE

(75) Inventor: Samuel Bernard, Paris (FR)

(73) Assignee: Bouygues Telecom, Boulogne Billancourt (FR)

( * ) Notice: Subject to any disclaimer, the term of this patent is extended or adjusted under 35 U.S.C. 154(b) by 742 days.

(21) Appl. No.: 11/951,507

(22) Filed: Dec. 6, 2007

(65) Prior Publication Data

US 2009/0264111 A1 Oct. 22, 2009

(30) Foreign Application Priority Data

Dec. 13, 2006 (FR) ...................................... 06 55474

(51) Int. Cl.
*H04L 29/06* (2006.01)
(52) U.S. Cl. .................................. 455/414.3; 455/414.2
(58) Field of Classification Search ............... 455/414.1, 455/414.3
See application file for complete search history.

(56) References Cited

U.S. PATENT DOCUMENTS

| | | | |
|---|---|---|---|
| 7,764,952 B1 * | 7/2010 | Sipher et al. ............... | 455/414.1 |
| 2006/0190616 A1 * | 8/2006 | Mayerhofer et al. ......... | 709/231 |
| 2006/0265503 A1 * | 11/2006 | Jones et al. .................. | 709/227 |
| 2007/0077921 A1 * | 4/2007 | Hayashi et al. ............. | 455/414.1 |
| 2007/0118675 A1 * | 5/2007 | Kawaguchi ................... | 710/305 |
| 2007/0296805 A1 * | 12/2007 | Tedenvall et al. ........... | 348/14.01 |

* cited by examiner

*Primary Examiner* — Lester Kincaid
*Assistant Examiner* — Isaak R Jama
(74) *Attorney, Agent, or Firm* — Harness, Dickey & Pierce, P.L.C.

(57) ABSTRACT

The field of mobile telephony and, more particularly to accessing podcast content from mobile telephones is disclosed. More precisely, a method and a system for downloading a podcast on a Web server onto a mobile terminal, the method including:

a step of a platform storing the address of the podcast at the request of a user on the mobile telecommunications network, a step of the platform verifying the update of the podcast and downloading the updated podcast onto this platform, a step of the platform sending the mobile terminal an address on the platform to allow said downloaded podcast to be downloaded by the mobile terminal via the mobile network, and a step of the terminal actually downloading the podcast stored on the platform via the mobile network.

10 Claims, 4 Drawing Sheets

PODCASTING ON A MOBILE PHONE

CROSS-REFERENCE TO RELATED APPLICATIONS

This application claims priority to French Application No. 0655474, filed Dec. 13, 2006, which is incorporated by reference herein.

BACKGROUND AND SUMMARY

The invention relates to the field of mobile telephony and, more particularly to accessing podcast content from mobile telephones.

The invention relates to a method and an associated system on a mobile telephone for downloading sporadically updated digital content (podcast) listed in a first data stream (RSS feed—Really Simple Syndication) including indications for updating said digital content, said first data stream being generated at a first IP address by at least one computer server of a computer network, the method including the following steps:
 computer device verifies, via said computer network, the update indications generated at said first IP address,
 said computer device downloads said digital content listed in said first data stream in the event of an update, said downloaded digital content being stored on the computer device.

A podcast is a digital file, generally with multimedia content (sound, video, etc.) which, by means of a subscription to an RSS feed or similar with which it is associated, can be downloaded automatically using aggregator software and is designed to be listened to or viewed later on a mobile device, such as an MP3 player. RSS feed is a technology, generally but not exclusively based on the XML format (extensible Markup Language), by means of which a website transmits, at the request of the aggregator, the list of recent modifications to the site, in particular those of a podcast file with which the feed is associated. Technically, an RSS feed is an XML document made accessible by a website with an associated URL (Uniform Resource Locator) address, this document including all the modifications made and the URL address at which the podcast is available for download.

The main use of these RSS feeds is to inform about changes in a website, and thus of a file to be downloaded, without needing to access such site to check all its contents. The application of this technology requires the user station to have an aggregator. An aggregator is a software application which can follow several syndication feeds, such as RSS or Atom, at the same time, and can therefore notify the user when content is updated on a website. In practice, when the user subscribes to RSS feeds (those of sites in which the user is interested), the aggregator periodically checks the status of these RSS feeds and informs the user of any possible updates, when applicable. The aggregator then allows an updated file associated with the updated RSS feed to be downloaded automatically. The advent and development of this technology remain limited to the field of computers and websites. Access to such content is generally only possible over the internet.

One aim of the invention is to allow podcast files to be downloaded onto a user's mobile terminal by means of communication networks. Since mobile telephony offers solutions such as direct access to the internet and associated websites, it is now desirable to allow these mobile terminals to access podcast content. In part due to mobile phone memory size and cellular network bandwidth limitations and, in part, due to the size of the podcast files to be downloaded, it remains difficult at present to implement the system of subscriptions used on personal computers on a mobile telephone. This is why the first proprietary solutions have been developed to meet this expectation of the mobile telephone market.

We know, first of all, from patent application U.S.-2006/0155698, a system allowing a mobile telephone user to be notified by SMS (Short Message Service) or voice message when a website containing RSS feeds has been updated. The system mainly includes an on-line aggregator (which is to say connected to the internet) which scans the RSS feeds on behalf of the user. When it detects a modification, the aggregator sends a formatted SMS message or a voice message to notify the user. The user then uses conventional computer means to visit the website and view the changes. The user can then download the desired file onto his/her personal computer and load it onto his/her mobile terminal using conventional mechanisms (USB—Universal Serial Bus—connection, Bluetooth or similar). This system relates to the concept of website modifications and does not deal with the field of podcasts (multimedia files to be downloaded), which require the multimedia file to be transferred to the mobile terminal.

A first disadvantage of this solution is that it does not allow multimedia files associated with an RSS feed to be downloaded anywhere simply using a mobile telephone. Another disadvantage of this solution is that, in order to subscribe to an RSS feed, a user needs an internet connection to access and configure the aggregator.

One problem that arises in relation to this patent application is therefore that of providing a system and/or a method allowing the user, when notified of an update, to access the podcast files without requiring the use of the internet or the computer equipment associated with this network (for example a Web server). However, solutions such as Mobilcast by Melodeo or Pod2mob (trade names) are known which provide, by means of a dedicated application loaded on the mobile telephone, access to a plurality of podcasts preloaded on a dedicated server of the mobile telecommunications network. When launching the embedded application, the latter updates the accessible podcasts and the user can then download the chosen podcast with a single click. This solution is similar to a simple method for downloading content onto a mobile telephone.

The Mobilcast solution also increases the list of podcasts which can be accessed by a mobile by indicating, from a dedicated website interface, a new podcast designed for mobiles from a list predefined by the supplier. This predefined list allows the supplier to configure podcast content for mobiles in advance. In addition, there is a considerable latency period between the web interface selecting a new podcast and it becoming accessible on the mobile telephone server.

One disadvantage of these solutions lies in the fact that the user must voluntarily launch an action (access the dedicated mobile portal) to recover the list of new podcasts available on the server and thus updated. One aim of the invention is also to render the follow-up of content modifications intrinsically independent from user actions.

Also known is the Kimia solution (trade name) which, using a defined list of podcasts, checks for updates and, when applicable, transcodes said podcasts into mobile format to make them available on its Web server. The mobile user is then notified of the podcast updates by e-mail, and must visit the dedicated website to access the updated files. Such a solution complies with the previously mentioned method.

One major disadvantage of the known solutions of the prior art is that the podcast content available to the user is limited to that previously loaded or listed on the central server (web or mobile telephone server). One aim of the invention is therefore to allow users to access any available podcast content whatsoever, in particular those on the internet. The technical limitations of these known solutions provide an impediment, in this design, to accessing any podcast content anywhere. Another disadvantage of these known solutions lies in the fact that the user's mobile telephone is not sufficient to access a podcast. In particular, the Kimia solution requires the modified podcast to be accessed via a website following an e-mail notification, while Mobilcast requires visiting the supplier's website to add a new podcast to the list of podcasts for mobiles available on the mobile telephone portal (server). Another disadvantage of the Kima solution lies in the intrusive nature of the update notifications (by e-mail in this case).

These problems of the prior art are solved by using a gateway device between the computer networks (those containing the podcasts and RSS feeds) and the mobile telecommunications networks, this device acting as a content aggregator between these two networks. Users can then configure the device with the address of an RSS feed of their choice using their mobile terminals. The device then sends the mobile the address for downloading the available content via the mobile network on this gateway.

Thus, it is easy to configure this device for a new podcast of the user's choice. Automation of the downloading and formatting process by this device, when coupled with the invention, provides mobile users with quick access to the podcasts where the prior art required a considerable delay (request to be made on the Web server, latency period while processing the request, delay for supply to the mobile telephony server). In addition, it is now possible to configure a new podcast without using the internet or any websites. Thus, the invention provides unlimited access to any podcast of the user's choice, in a short time, anywhere and with the sole intervention of the mobile terminal.

In this design, the invention initially relates to a method for downloading onto a mobile terminal such as previously described, also including the following steps:
  the computer device stores said first IP address (URL1), said storage taking place after sending a first request including said first IP address (URL1) from the mobile terminal to the computer device,
  the computer device verifies whether said first address (URL1) of the first request matches content listed in a first database, and
  if the verification is positive,
  the computer device sends the mobile terminal a second IP address (URL2) of the computer device so as to allow said downloaded digital content to be downloaded by the mobile terminal over a mobile telecommunications network,
  the mobile terminal connects to said second IP address (URL2) via the mobile telecommunications network and downloads said updated digital content from the computer device,
  if the verification is negative, it stores said first IP address (URL1) in a second database and fulfils said first request for the mobile terminal.

During the initial step, the user supplies the central platform (computer device) with a new RSS feed address, not limited to those pre-stored in the server. It is understood that storing the address entails that it was not already known to the platform, which is to say that it was not stored in any of the pre-configured address lists. The use of addresses in URL format makes it possible, in particular to supply new RSS feeds in a completely independent manner from the address of the platform. Said first request launches all the steps from storing the address to subsequently receiving the update of the podcast and the RSS feed, including the initial download of the latter, which is to say after the user inscribes a new RSS feed (new address) on the platform.

Returning to the platform configuration, the latter sends the mobile the indications (second address) allowing the podcast to be downloaded onto the platform. This is, in particular, a URL address, either directly for the podcast or for an equivalent RSS feed generated by the platform and containing the address at which the podcast can be downloaded from the platform. This second alternative is preferable in that it conforms to known podcasting mechanisms, which is to say that the mobile telephone is notified of possible updates via the RSS feed generated at the new (second) address, without having to access the content. This mechanism allows transparent, quick management of the request from the mobile terminal. The terminal is then notified either that the podcast is available—first address already in database and sending of the second address—or that it must enter a wait cycle while the platform downloads said podcast and makes it available (said device only fulfils the first request).

The user's mobile telephone is equipped with an embedded aggregator application for managing the RSS feeds to which it has subscribed by means of the platform. In its role of podcast relay, it is provided for the method also to include the following steps:
  said computer device generates, at said second IP address (URL2), a second data stream including indications for updating said digital content according to said first data stream,
  the mobile terminal verifies, via the mobile telecommunications network, the update indications generated at said second IP address (URL2),
  the download of said downloaded digital content by the mobile terminal depends on the detection of an update in the second IP address.

It is therefore noted that the initial RSS feed is distributed over the mobile telecommunications network. In this way, the mechanisms of the RSS feed are transported over this network allowing the mobile terminal, via the embedded aggregator, to be informed of content updates. The standard principles relating to RSS feeds can then be applied, in particular automatic content downloads in the event of an update.

In one embodiment, the embedded aggregator directly reads the address URL2' in the RSS feed downloaded from the address URL2, proceeds to download the podcast from the address URL2' in the event of an update, and stores it in the user's mobile telephone. In one embodiment, it is provided for the data streams each to contain the IP address (URL1', URL2') which stores the corresponding digital content. Simple knowledge of the RSS feed therefore allows either the platform or the aggregator of the mobile telephone to access the content (via these addresses URL1' and URL2') by simply reading the information in the RSS feed. In addition, this configuration simplifies the management of the platform, since it is supplied with a single initial address and, in response, a single address is supplied to the mobile telephone. In practice, the RSS feed is in XML format and includes a predefined tag containing the URL address from which the podcast content can be downloaded.

The mobile telephone network has numerous constraints relating to the resources of the terminals (available memory, processing capacity) or of the actual network (transfer rate, bandwidth, etc). To adapt to the limitations of the network, it is provided for the method to include, when said data streams are tagged files (such as XML), a step of converting said first data stream into said second data stream, said conversion including deleting and replacing tags as well as modifying said first IP address to said second IP address. The main aim of deletion is to reduce the size of the XML file to be downloaded by the mobile terminal, only conserving a limited history of modifications stored in the file (for example, the last ten entries) and purging the unnecessary tags, for example tags used only by iTunes (trade name). The replacement of tags has the purpose of complying, where applicable, with the interpretive language embedded in the mobile. As an example, a tag called <adresse> on a French site can be replaced with an <address> tag interpreted by the aggregator of the mobile terminal. Finally, the address of the podcast in the XML file of the RSS feed is updated to show the address at which the podcast can be available on the platform.

It is also possible to provide a step for converting said podcast digital content to a multimedia format compatible with that of said mobile terminal, said conversion being performed by said computer device after downloading said content. As an example, the initial podcast can be converted to the size of 176×144 pixels and MPEG-4 (Moving Picture Experts Group 4) or 3GP format. However, a large number of formats can be used. It is also foreseeable to send beforehand, for example in the first request sent from the mobile terminal, data indicating the format(s) compatible with the terminal in question.

In particular, the conversion of said downloaded digital content precedes the conversion of said first data stream. This order has the advantage of the podcast already being converted when the RSS feed is also converted. Thus, the access to the updated RSS feed and the download of the associated podcast are not carried out on a half-converted or unconverted file.

If the verification by the computer device, when said first address (URL1) of the first request corresponds to content listed in a first database, is negative, it is provided for the method to include the following steps after storing said first IP address (URL1) in the second database:
  the computer device downloads said digital content listed in the first data stream generated at the first address (URL1),
  the computer device converts said downloaded digital content and the first data stream into formats that are compatible with the mobile terminal, and
  once the conversions have been performed, the computer device sends said second IP address (URL2) to said mobile terminal.
By means of these steps, the platform downloads the podcast, converts it to the necessary format at the same time as the RSS feed and makes them accessible to the mobile terminal by sending the latter the second address.

To increase the energy efficiency of the telephone, it is provided for the telephone to cut off its connection with the platform after the request has been fulfilled. Thus, to inform the terminal, the second IP address is sent in response to a subsequent request from the latter. In practice, in a similar way to how a conventional aggregator checks for updates, it is provided for the mobile telephone (via its embedded aggregator application) to submit periodic requests to the platform until it obtains the new address.

According to one variation, which is rather intrusive, the second IP address is sent in the form of a push to said mobile terminal. For example, by a text message sent to the telephone or by a forced network notification displaying a message on the telephone (for example, a command using the embedded application to pass on the notification). In this case, this notification is considered to be emitted in response to the initial request from the user, even if there is a subsequent processing delay. In one embodiment, said second IP address is the address (URL2') at which the computer device stores said downloaded digital content.

The invention also relates to a platform for downloading onto a mobile terminal sporadically updated digital content listed in a first data stream including indications for updating said digital content, said first data stream being generated at a first IP address (URL1) of a computer network, the platform including:
  means for storing said first IP address (URL1) upon receiving a first request from a mobile terminal, said storage means including first and second databases, the first database storing said first IP address upon receiving the first request when this first address is not stored in the second database,
  means for verifying, via the computer network, update indications generated at said first IP address,
  means for downloading and storing said digital content listed in said first data stream in the event of an update, and
  means for sending the mobile terminal a second IP address (URL2) of the computer device used to download said digital content by the mobile terminal over a mobile telecommunications network.

Software verification means can be used to detect a possible update. The latter is detected if the data available on the platform are different from those present at the specified address, for example (i) when initialising the system, since the platform has not yet accessed the site, the RSS feed read at address URL1 is different from that stored on the platform so that the latter considers that an update has taken place and therefore proceeds with the ensuing download steps, or (ii) subsequently when the website and its contents are updated so that the data of the RSS feed of this site are different from those stored on the platform.

In one embodiment, it is provided for the download and storage means to be arranged to transfer said first address stored in the first database to the second database when said digital content is downloaded and supplied to said mobile terminal over the mobile telecommunications network. This transfer is carried out simply by deleting the first address in the first database and storing it in the second database. This facilitates the detection of an address already present in the platform, which is to say an address whose contents are already accessible in the format adapted to mobiles. Unnecessary processing of downloads and conversion of already stored contents are therefore avoided.

The download and storage means possibly include software means for converting said digital content and said first data stream into adapted digital content and a second data stream adapted to the format of said mobile terminal. The term platform (equivalent to the term computer device) must be understood in the broadest sense, in particular since it may consist of several devices allocated to the various functions to be performed, in particular one device can process the RSS feed and the second IP address URL2, while a second device can be used for the purpose of storing and supplying converted podcasts to the mobile network (to the address URL2').

The invention also relates to a system for downloading onto a mobile terminal sporadically updated digital content listed in a first data stream including indications for updating said digital content, the system including:
  at least one computer server generating said first data stream at a first IP address (URL1),
  a platform as described above, and at least one mobile terminal including means for establishing, on the mobile telecommunications network, a connection with said second IP address (URL2) and downloading said digital content from said computer device.

In practice, the podcast and the RSS feed are available on the same Web server. According to one variation, the RSS feed generated at the first address URL1 on a Web server contains the address URL1' at which the podcast is stored on another Web server.

BRIEF DESCRIPTION OF THE DRAWINGS

The invention will be understood better from the following description, provided merely for the purpose of explanation, of one embodiment of the invention, in reference to the appended drawings.

DETAILED DESCRIPTION

In the example of an embodiment described herein, the term "podcast" is used to designate a multimedia file as previously defined.

Figure 1:
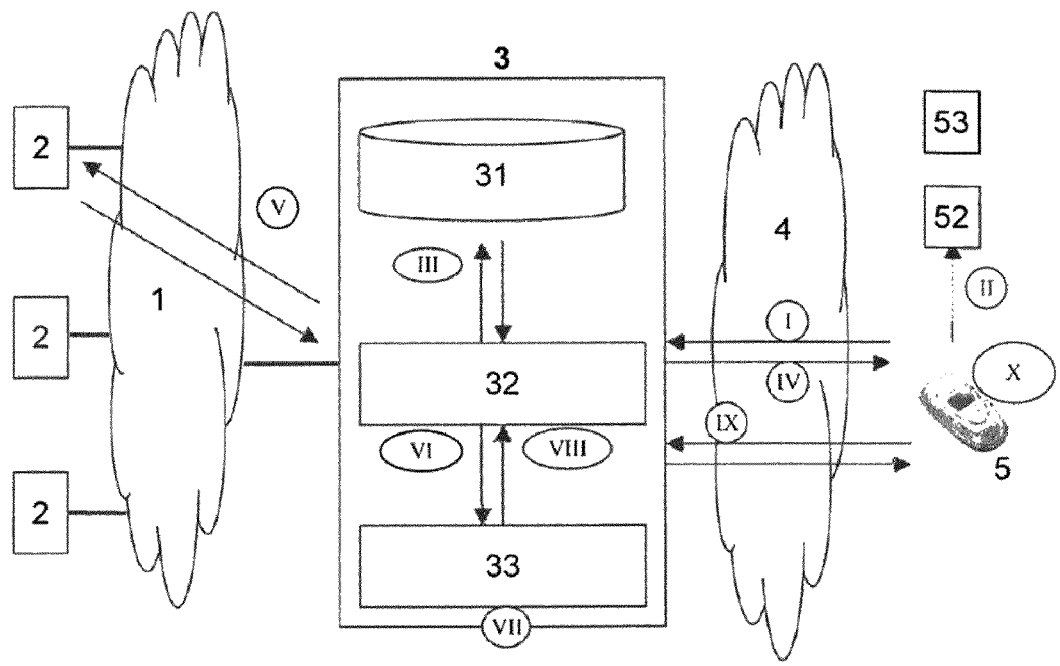
FIG. 1 shows an example of a system architecture in which the invention is implemented.

In reference to FIG. 1, podcasts (multimedia files) and their RSS feeds are supplied to users over the internet 1 according to RSS feed mechanisms which are known in the context of the internet. The Web servers 2 store the multimedia files and distribute the RSS feeds associated with these media. The following depicts a simplified example of an RSS feed:

```
- <channel>
    <title>... </title>
  - <image>... </image>
    <itunes:image href="..." />
  - <item>
      <title>... </title>
      <link>... </link>
      <pubDate>...</pubDate>
      <source url="http://.../rss.xml">...</source>
    - <itunes:category text="...">
      <itunes:subtitle>...</itunes:subtitle>
      <itunes:author>... </itunes:author>
      <itunes:duration>... </itunes:duration>
  </item>
  <item>
  ...
- </channel>
```

This feed, delimited by the <channel> tags, consist mainly of a general section (in this case <title> and <image>) and several items delimited by the <item> and </item> tags. Each of these elements defines a dated datum and includes a large number of fields (none of which are shown), mainly fields used by the iTunes player (trade name). In the context of podcasts, the successive items represent the indications of updated versions; for example, the first <item> item contains information relating to the current version (in particular its date), the second <item> item contains information relating to the preceding version, etc.

A central platform 3 also belongs to the internet 1. This platform includes three elements:

a database 31 for storing information regarding the subscribed podcasts;

a web and FTP server 32 for storing the transcoded podcasts;

a transcoder 33 containing a Web server for transcoding the RSS file and the media.

The platform is also equipped with an interface (not shown) with a mobile telecommunications network 4 such as those normally used by mobile telephones (GSM, GPRS, EDGE, UMTS, etc.).

An end user is equipped with a mobile telephone 5 capable of connecting and communicating over the network 4. The telephone 5 is equipped with software 51 allowing it to interface with the platform 3 on the network 4. This software (embedded application) allows the user mainly to access a portal of podcasts supplied on the platform 3 in a substantially similar fashion to the solutions of the prior art.

In particular, the database 31 includes a Podcast_Portal table 31a containing a list of predefined podcasts by partner editors hosted by the server 32. This table contains the following attributes: (URL_1, URL_2, <title_channel>). URL_1 defines the address of the podcast on the internet 1 and URL_2 the address on the platform 3 from which mobile telephones 5 can access the podcasts. <title_channel> allows the user easily to identify the podcast in question, for example by a chain of characters. The following is an example of a Podcast_Portal including two entries:

Entry 1:
    URL_1: http://www.lequipe.fr/podcast_rss.xml,
    URL_2: http://platform/Data/lequipe/Mobile_format/rss.xml
    <title_channel>: L'équipe;
Entry 2:
    URL_1: http://www.BFM.com/BFMchannel9.xml,
    URL_2: http://platform/Data/BFM/Mobile_format/rss.xml
    <title_channel>: BFM By using their telephones 5 to connect to the aforementioned portal, users access the predefined list resulting from the table 31a and download the associated multimedia content using conventional mechanisms. Likewise, using well-known mechanisms, the user subscribes to the RSS feed associated with the desired content, which configures the embedded application 51 in the telephone to connect periodically to the RSS feed of the platform and automatically to download the updated content, when necessary. The application 51 then acts as a content aggregator in the sense generally used in the context of RSS feeds on the internet.

To implement the invention, the database 31 also comprises a Podcast_Subscribed table 31b listing all the podcasts requested by the users using the present invention and a Podcast_Processing table 31c listing the podcasts requested by the users but still not available for download, since the request is being processed as will be described below.

The Podcast_Processing table 31c contains the attribute: (URL_1). This is the address requested by the user. The following is an example:
Entry 1:
    URL_1: http:tf1.lci.fr/xml/rss/0,,150,00.xml
The Podcast_Subscribed table 31b contains the attributes: (URL_1, URL_2, <title_channel>). It has a similar format to the Podcast_Portal table, but its contents are different in that it lists all the podcasts voluntarily requested by the users. After processing (as will be seen below) the podcast listed in the Podcast_Processing table above, the Podcast_Subscribed table includes the following entry:

```
URL_1: http://tf1.lci.fr/xml/rss/0,0.23,00.xml
URL_2: http://computer_device.com/Data/...
             ...LCI_La_meteo/Mobile_format/RSS.xml
<title_channel>: LCI Météo
```

The transcoder 33 contains, on the other hand, a database containing a Podcast_Transcoded table listing the podcasts which have been declared available on the podcast platform 3. This table contains the attribute (<title_channel>, URL_1), for example:

```
<title_channel>: LCI Météo
URL_1: http://tf1.lci.fr/xml/rss/0,0.23,00.xml
```

In practice, the transcoder 33 receives the media and the RSS feed from the Web server 32, transcodes the media into formats that can be read by the mobile (for example 0.3gp) (several encoding formats can be considered) and reduces the size of the RSS files, in particular by removing the iTunes tags and only keeping the last 20 media.

The mobile telephone 5 has an embedded rich-media application 51 for reading podcasts based on Bluestreak technology (trade name). A rich-media application is a system or a software application that provides access to image, sound, text and video content on a terminal, particularly on a mobile terminal, all the content being played back (executed to display the sound or images to the user) in parallel and not in a linear manner. Thanks to this application, it is possible to read a reasonably sized RSS file, which is to say smaller than 400 kB (kilobytes), due to the limited memory of the telephone.

Three XML files are stored in the telephone to classify the podcasts stored on the telephone:
- Subscription.xml 52 which lists the subscribed podcasts (which is to say the RSS feed addresses) and the media (multimedia files) stored on the telephone's memory card,
- Podcast_Requested.xml 53 which lists the podcasts of the new podcasts requested,
- Not_Subscribed.xml 54 which lists the podcasts and RSS feeds to which the user has not subscribed, but which have already been downloaded.

The application 51 offers the user the possibility of subscribing to all kinds of podcasts by entering the URL address of the desired podcast.

Request for Subscription to a Podcast that Cannot be Read by the Mobile

Figure 2:
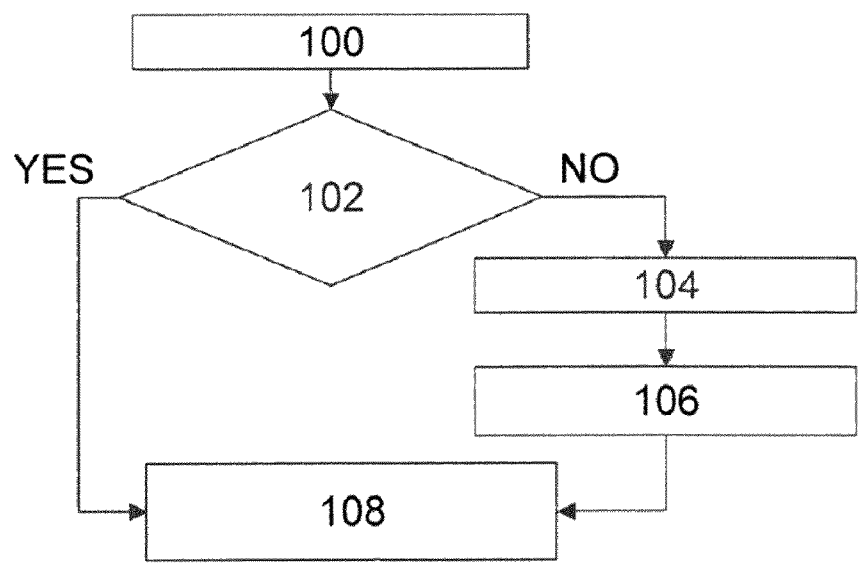
FIGS. 2, 3 and 5 are flow charts showing different steps of the method according to the invention (general in FIG. 2, dedicated for mobile terminal in FIG. 3 and dedicated for the central platform in FIG. 5)
Figure 4:
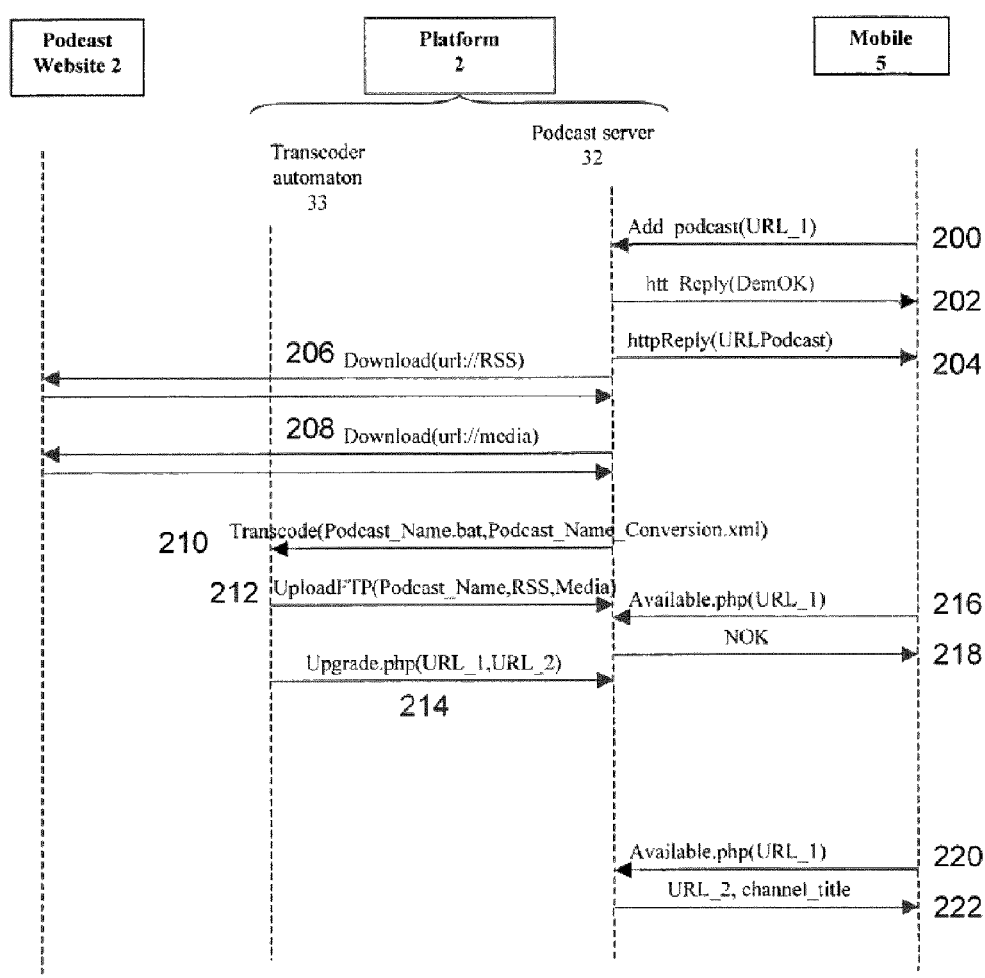
FIG. 4 is a chronogram of data exchanges between the devices in the architecture according to FIG. 1.

The telephone 5 has means for connecting to the internet 2 over the mobile telephone network 4. Such means are well known in the prior art. In this way, a user browsing the internet using a computer or a mobile telephone becomes interested in a Bouygues (trade name) podcast including an audio news flash and an RSS feed at the address "http://www.bouygues.com/rss.xml". In reference to FIGS. 1, 2 and 4, the user launches a function of the embedded application of the mobile 5 which, when executed, sends (I, 200) a http request add_podcast(http://www.bouygues.com/rss.xml) to the platform 3 over the mobile telephone network 4. An alternative is for the user to access a section called "other podcast" in the aforementioned portal and manually enter the address (URL) "http://www.bouygues.com/rss.xml" of the podcast he/she wants to receive on his/her mobile.

The mobile stores (II) the URL of the podcast in the local file Podcast_Requested.xml 52 in the telephone's memory. This file is in the form of an XML document listing the addresses and names of the requested podcasts and the date of the request with the tags <URL_1>, <title_channel> and <date>. The purpose of this file 52 is to keep track of the podcasts requested so that the mobile can be informed subsequently when the requested podcast becomes available. On the other hand, the Web server 32 of the platform 3, processes (100) the request add_podcast(http://www.bouygues.com/rss.xml) and queries the database 31 to determine whether the podcast has already been requested by another mobile or if the podcast has already been converted by the platform (III, 102).

If the podcast requested by the user is not found in the Podcast_Portal 31a or Podcast_Subscribed 31b tables (outcome of 102 is NO), the Web server replies to the mobile that its request has been received (106, 202) and stores the address URL_1=http://www.bouygues.com/rss.xml in the Podcast_Processing table 31c (104). If the podcast requested by the user is found in the Podcast_Portal 31a or Podcast_Subscribed 31b tables (outcome of 102 is YES), then the server 32, which may have already fulfilled the request (202), informs the mobile 5 that the podcast is available by sending, in response to the Add_Podcast request, the parameters of the requested podcast (URL_1, URL_2, <title_channel>) taken from the corresponding table (IV, 108, 204).

Figure 3:
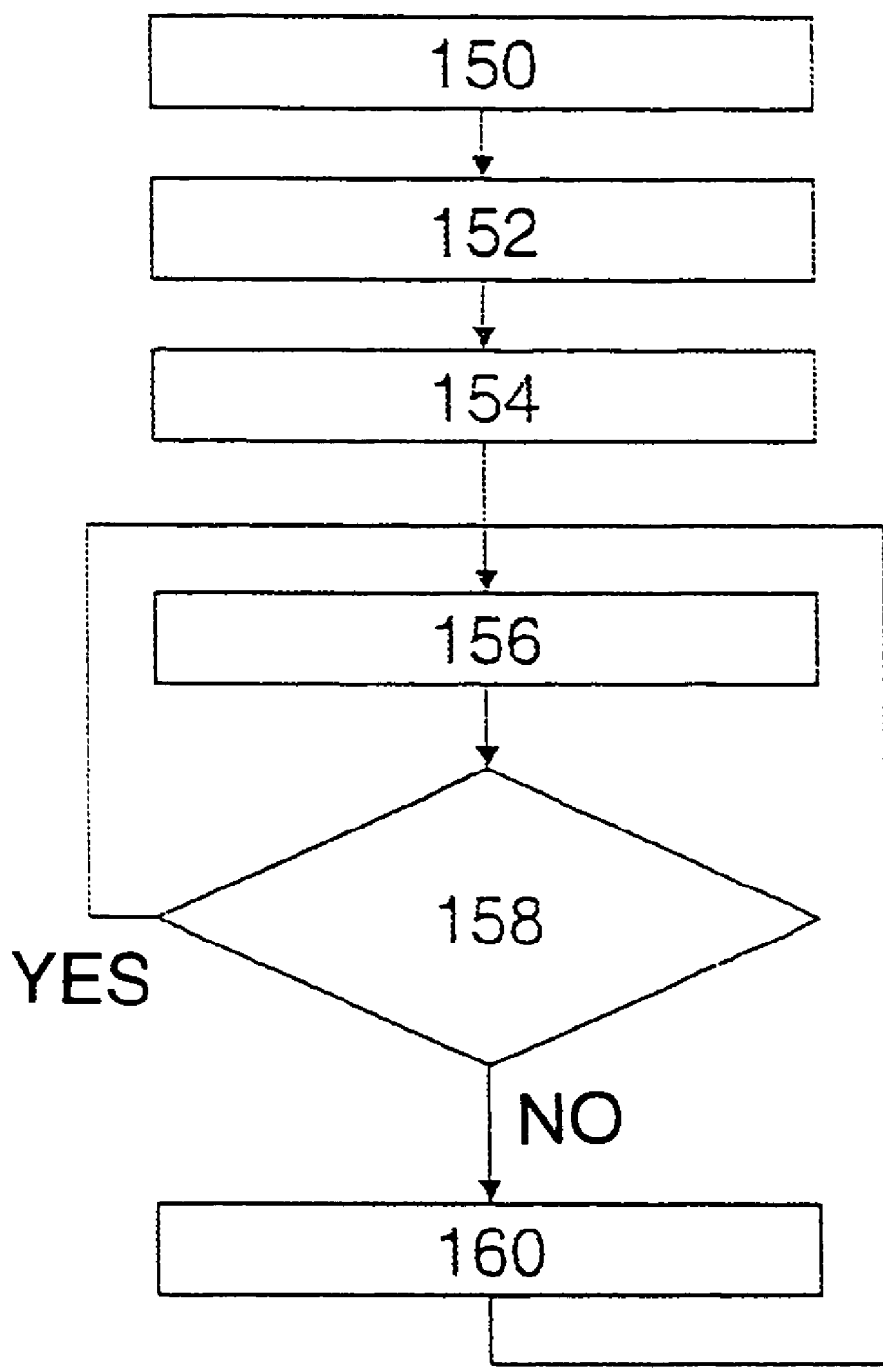

In reference to FIG. 3, the mobile receiving (150) the parameters of the podcast (URL1, URL2, <title_channel>) adds URL_2 and <channel_title> to the Subscription.xml file 53 and deletes URL_1 from the Podcast_Requested.xml file 52 (152). The presence of URL_2 in the Subscription.xml file results in regular updates of the podcast according to standard mechanisms relating to the follow-up of updates using RSS feeds (the embedded application 51 then acts as a content aggregator).

Conversion of the Podcast to Mobile Format

The presence of the URL http://www.bouygues.com/rss.xml in the Podcast_Processing table 31c launches the process to convert the podcast to mobile format. Once again in reference to FIGS. 1 and 4, the Web server 32 of the platform launches the download (206—download of the RSS feed, 208—download of the podcast file), via the internet 1:
  of the RSS feed of the podcast, and
  of the podcast media The Podcast_Name (in this case "Bouygues") and Internet_Format folders are created in a local Data folder (on the Web server 32): Data\Bouygues. The downloaded media files and RSS feeds are stored in this folder (V, FIG. 1) Data\Bouygues\Internet_Format.

The Web server 32 generates a file "podcast_name.bat" for the transcoding operation. This file contains the name and address in the local folder of the media to be converted and the audio/video conversion format. The following is a simplified example of such a file:

```
<job>
<input>
  <file name="C:\Data\Podcast_Name\Internet_Format\Media.avi" />
</input>
<output>
  <file name="C:\Data\Podcast_Name\Mobile_Format\Media.3gp" />
</output>
<parameters>
    <export>
  <parameter id="MTUSize" value="400" />
  <parameter id="exportType" value="3gpp" />
  <parameter id="hinted" value="true" />
  <parameter id="progressiveDownload" value="true" />
    </export>
```

```
    <videoEncoder>
<parameter id="..." value="..." /> ...
    <audioEncoder>
<parameter id="..." value="..." /> ...
</parameters>
</job>
```

The <input> tags define the initial file to be converted and the <output> tags specify the storage path of the file once converted. It also defines the parameters (<parameters>) for video encoding and audio encoding. Finally, the server 32 sends (VI, 210) the Transcode request with the address of the .bat file and the address of the RSS as parameters for converting the media in the transcoder 33:
Transcode(http://platform/Data/Bouygues/Internet_Format/podcast_name.bat, http://platform/Data/Bouygues/Internet_Format/RSS.xml)

Upon receiving the Transcode request including the parameters listed above, the transcoder 33:
  (a). creates the Bouygues folder in the local tree structure of its files: d:/Data/To_transcode if the folder does not exist,
  (b). downloads the media and the RSS file (downloaded on the server 32) by FTP (File Transport Protocol) into the folder d:/Data/To_transcode/Bouygues,
  (c). transcodes (VII, FIG. 1) the media and the RSS file.
The transcoder 33 converts the media of the podcast in MPEG-4 in a 0.3gp container application and the RSS file is made smaller by deleting the iTunes tags and listing the last ten media in the podcast. In particular, the transcoder 33 converts the RSS file using a C/C++ component. Its role is to download the RSS file and to search the file in order to apply rules of tag replacement or deletion with a view to reducing the size of the RSS.xml file. The RSS file is also modified so that the URL addresses of the multimedia files link to multimedia files that are stored on the Web server 32 (VII, FIG. 1): the RSS file which initially indicated http://www.bouygues.com/medias/flash.wav
is modified to now link to
http://platform/Data/Bouygues/Mobile_Format/flash.mpg Returning to the RSS feed example presented above, the following file is schematically obtained (deletion of the iTunes tags) in which only a predefined number of items (<item>) have been conserved (the last twenty versions of the media, for example).

```
- <channel>
    <title>... </title>
- <image>... </image>
- <item>
        <title>...</title>
        <link>... </link>
        <pubDate>...</pubDate>
        <source url="http://.../rss.xml">...</source>
    </item>
    <item>
    ...
- </channel>
```

Figure 5:
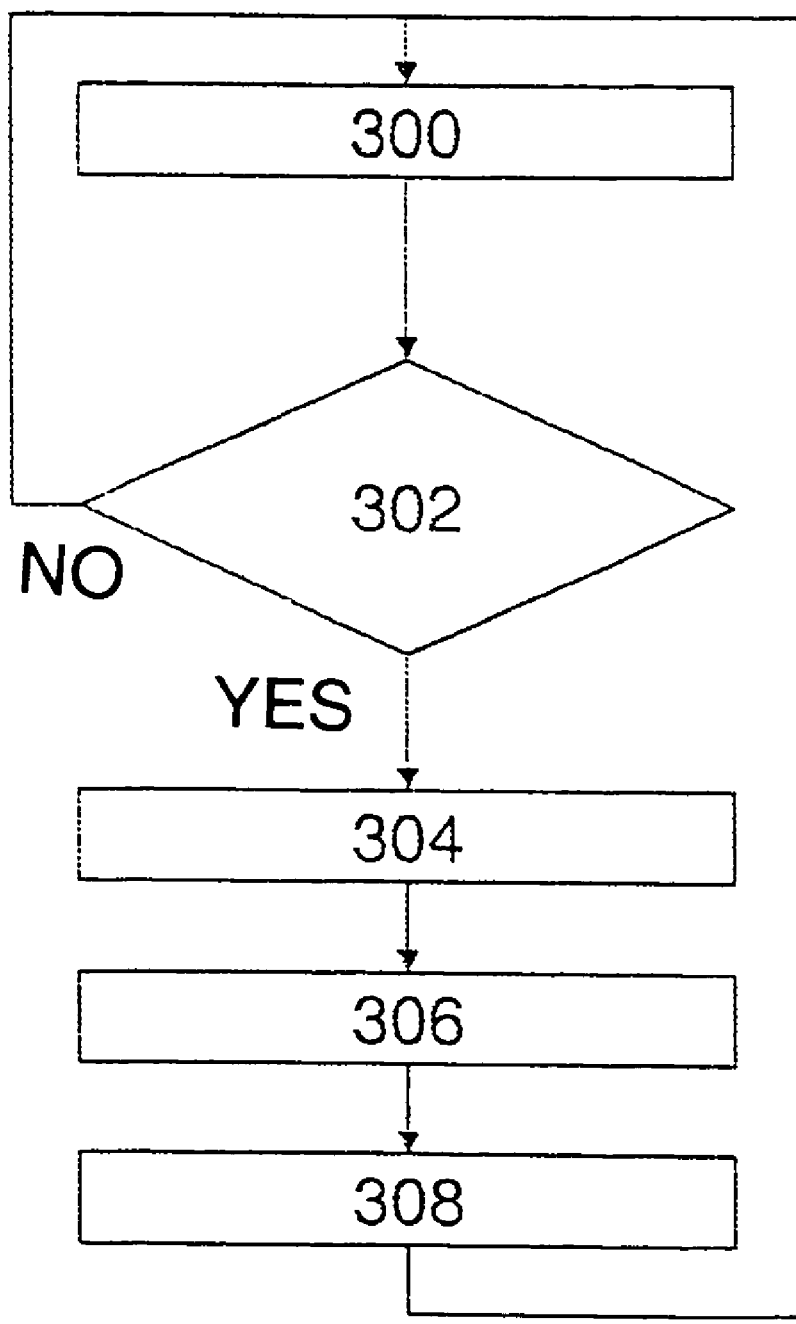

(d). uploads (VIII, FIG. 1; 212) the converted media and RSS file onto the podcast platform of the Web server 32,
  (e). deletes the files in d:/Data/To_transcode/Bouygues,
  (f). consults the Podcast_Transcoded table:
    If Podcast_Name (in this case "Bouygues") is not already in the Podcast_Transcoded table, the podcast is new and is not yet declared as being available on the platform 3:
      the transcoder 33 sends (214) the request Upgrade(Podcast_Name) to the server 32 to inform it to add Podcast_Name and the URL__2 generated in the Podcast_Subscribed table 31b of its database and to delete Podcast_Name from the Podcast_Processing table 31c,
      and writes the "Bouygues" field in the Podcast_Transcoded table.
    If Podcast_Name is already in the Podcast_Transcoded table (meaning that it is a simple podcast update), the podcast is declared to be available on the podcast platform; no request is then sent, as the "upload" writes over the existing files.
Availability Notification to the Mobile
  When reading the Podcast_Requested.xml file 53, the mobile 5 sends (IX, 154, 216, 220) the following request at given intervals:
    Available(URL://RSS_Bouygues.XML)
  to the Web server 32 to find out whether the requested podcast (or podcasts) is available. If the requested podcast has been processed, the Web server 32 sends back (108, 222) the parameters of the requested podcast (URL__1, URL__2, <title_channel>) where URL__2 is the address on the platform of the podcast converted to the format adapted for the mobile. Otherwise, the server sends the mobile the reply that the request has been received (218). The notification of the podcast availability can also possibly be sent by "pushing" a message to the mobile.
Subscription of the Mobile to the Podcast
  The mobile receives the address of the RSS file transcoded to the mobile format (following message 108 or 222) and adds it (X, FIG. 1; 152) to its local Podcast_Subscribed table so as to add such file to the podcast update process.
Updating Podcasts
  Podcasts are regularly updated information feeds. In order for the new media to be notified and readable on the mobile, the platform must update the RSS feeds and the media in mobile format. In reference to FIG. 5, starting with the URL addresses found in the Podcast_Portal 31a and Podcast_Subscribed 31b tables, the Web server 32 verifies (300) the RSS feeds associated with these addresses. This verification is cyclic, with periods that can vary from one podcast to another when, for example, the user has configured a verification period. The Web server identifies the new media by comparing (302) the RSS feed and the media contained in the Internet_Format folder of the file associated with the podcast. If no difference is found in this comparison (outcome of 302 is NO), the Web server 32 resumes its verification cycle. If a difference is found in this comparison (outcome of 302 is YES), the new media are downloaded (304) and converted to the correct format by sending the Transcode.php(Podcast_Name.bat,RSS.XML) request to the transcoder (306). The update process is carried out in such a way that the media are converted (306) and uploaded (308) to the Web server 32 before the new RSS file is uploaded in mobile format. The Web server 32 then returns to the RSS feed verification cycle (300) described above.
  In parallel, the telephone 5 verifies (156) the RSS feeds converted and generated by the platform 3 which are contained in the Subscription.xml file 53 (also Not_Subscribed.xml 54). Conventional mechanisms for comparing RSS feeds (158) and downloading podcasts (160) in the event of an update are applied.

The invention claimed is:

1. A method on a mobile terminal for downloading sporadically updated digital content listed in a first data stream including indications for updating the digital content, the first data stream being generated at a first IP address (URL1) by at least one computer server of a computer network, the method comprising the following steps of:

verifying an interface with a mobile telecommunications network, a central platform belonging to the computer network and further equipped with the interface, generating the indications at the first IP address (URL1);

using the central platform to download the digital content listed in the first data stream in the event of an update, storing the downloaded digital content on the central platform;

using the central platform to store the first IP address (URL1), the storage taking place after sending a first request including the first IP address (URL1) from the mobile terminal to the computer device;

using the central platform to verify whether the first address (URL1) of the first request matches content listed in a first database;

when the verification of whether the first address of the first request matches content listed in a first database is positive, using the central platform to send the mobile terminal a second IP address (URL2) of the central platform;

the mobile terminal connecting to the second IP address (URL2) via the mobile telecommunications network and downloading the updated digital content from the central platform;

when the verification of whether the first address of the first request matches content listed in a first database is negative, the central platform stores the first IP address (URL1) in a second database;

after the downloading of the digital content listed in the first data stream generated at the first address (URL1), the central platform converts the downloaded digital content and the first data stream into at least a format that is compatible with the mobile terminal; and once the conversions have been performed, the central platform sends the second IP address (URL2) to the mobile terminal so as to then allow the downloaded digital content to be downloaded by the mobile terminal over the mobile telecommunications network.

2. The method according to claim 1, also comprising the following steps:

the central platform generates, at the second IP address (URL2), a second data stream including indications for updating the digital content according to the first data stream;

the mobile terminal verifies, via the mobile telecommunications network, the update indications generated at the second IP address (URL2); and the download of the downloaded digital content by the mobile terminal depends on the detection of an update in the second IP address.

3. The method according to claim 2, wherein each data stream contains the IP address (URL1', URL2') where the corresponding digital content is stored.

4. The method according to claim 3, wherein the data streams are tagged files, the method including a step of converting the first data stream into the second data stream, the conversion including deleting and replacing tags as well as modifying the first IP address (URL1) to the second IP address.

5. The method according to claim 1, wherein the second IP address is sent in response to a subsequent request from the mobile terminal.

6. The method according to claim 1, wherein the second IP address is sent in the form of a push to mobile terminal.

7. The method according to claim 1, wherein the second IP address is the address (URL2') at which the central platform stores the downloaded digital content.

8. A central platform for downloading onto a mobile terminal sporadically updated digital content listed in a first data stream including indications for updating the digital content, the first data stream being generated at a first IP address (URL1) of a computer network, the central platform comprising:

storing the first IP address (URL1) upon receiving a first request from a mobile terminal, the storage including first and second databases, the first database storing the first IP address upon receiving the first request when this first address is not stored in the second database;

a means for verifying, via the computer network, update indications generated at the first IP address;

a device downloading and storing the digital content listed in the first data stream in the event of an update;

a sender sending the mobile terminal a second IP address (URL2) of the central platform used to download the digital content by the mobile terminal over a mobile telecommunications network;

wherein a download and storage device is arranged to transfer the first address stored in the first database to the second database when the digital content is downloaded and supplied to the mobile terminal over the mobile telecommunications network; and wherein the download and storage device includes software which operably converts the digital content and the first data stream into adapted digital content and a second data stream adapted to the format of the mobile terminal.

9. A system for downloading onto a mobile terminal sporadically updated digital content listed in a first data stream including indications for updating the digital content, the system comprising:

at least one computer server generating the first data stream at a first IP address (URL1);

a platform according to claim 8; and at least one mobile terminal including means for establishing, on the mobile telecommunications network, a connection with the second IP address (URL2) and downloading the digital content from the central platform.

10. A system for downloading sporadically updated digital content listed in a first data stream including indications for updating the digital content, the first data stream being generated at a first IP address (URL1) by at least one computer server of a computer network, the system comprising:

a central platform configured to interface with the computer network and configured to interface with a mobile telecommunication network, wherein the central platform is adapted to verify, via the computer network, the update indications generated at the first IP address (URL 1);

a mobile terminal communicating configured to communicate with the central platform over the mobile telecommunication network;

the central platform configured to download the digital content listed in the first data stream in the event of an update and configured to store the downloaded digital content and operably storing the first IP address (URL1), the storage taking place after the central platform receives a first request including the first IP address (URL1) from the mobile terminal;

the central platform configured to verify whether the first address (URL1) of the first request matches content listed in a first database, if the verification of whether the first address of the first request matches content listed in a first database is positive:
  a) the central platform sends the mobile terminal a second IP address (URL2), wherein the second IP address is an address of the central platform; and
  b) the mobile terminal connects to the second IP address (URL2) via the mobile telecommunications network and downloads the updated digital content from the central platform; and when the verification of whether the first address of the first request matches content listed in a first database is negative, the central platform stores the first IP address (URL1) in a second database:
  a) the central platform converts the downloaded digital content and the first data stream into at least a format that is compatible with the mobile terminal after the digital content listed in the first data stream generated at the first address (URL1) is downloaded; and
  b) the central platform sends the second IP address (URL2) to the mobile terminal and allows the mobile terminal to download the converted digital content over the mobile telecommunications network.

* * * * *